L. MOORE.
PACKAGING AND PRESERVING MEAT.
APPLICATION FILED AUG. 20, 1908.
954,535. Patented Apr. 12, 1910.
Fig. 1.
Fig. 2.
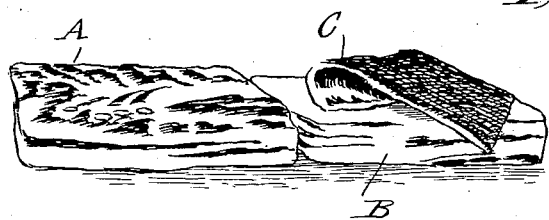
Fig. 3. Fig. 4.
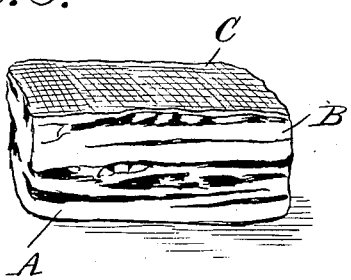 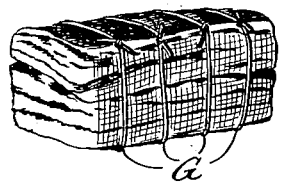
Fig. 5.
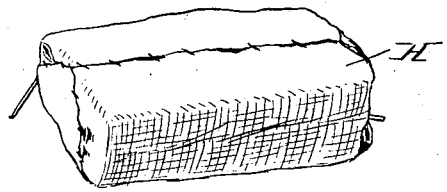
Witnesses
Thomas Durant
E. Gardiner
Inventor
Leonard Moore,
By Church & Church
his Attorneys

UNITED STATES PATENT OFFICE.

LEONARD MOORE, OF DAYTON, OHIO, ASSIGNOR TO DICKSON L. MOORE, OF DAYTON, OHIO.

PACKAGING AND PRESERVING MEAT.

954,535.

Specification of Letters Patent.

Patented Apr. 12, 1910.

Application filed August 20, 1908. Serial No. 449,488.

*To all whom it may concern:*

Be it known that I, LEONARD MOORE, a citizen of the United States, residing at Dayton, in the county of Montgomery and State of Ohio, have invented certain new and useful Improvements in Packaging and Preserving Meat; and I do hereby declare the following to be a full, clear, and exact description of the same, reference being had to the accompanying drawings, forming a part of this specification, and to the letters of reference marked thereon.

This invention relates to improvements in packaging, curing and preserving meat for human consumption, and is more especially, though not exclusively, applicable in the packaging, curing and preserving of pork, such as bacon. Probably no form of flesh food is more popular than bacon, but it is a matter of common observation and knowledge with those who include pork in their dietary that in one of its most palatable forms, a particularly objectionable feature is found to exist when the meat has been preliminarily prepared in accordance with present practices. The first layer of lean, *i. e.*, that on the interior surface of the flitch has become not only dirty from exposure to smoke, air and impurities of various kinds, but ordinarily it is hardened and acted on by the preservative agents and drying until it is as tough as the rind or skin, and as indigestible and difficult to masticate. The more choice the flitch is in all its essential characteristics the more conspicuously its one objection is shown. When sliced to prepare for cooking, each slice presents two edges or borders which are inedible and should be removed. If not sliced before cooking, the removal of the soiled and inedible portion of the interior surface is still more difficult and is attended with even greater loss of the contiguous edible portion. In any event, the percentage of waste is very large.

Resort is had to various means to avoid or disguise the objectionable features, such as scalding or washing, but the most common practice in order to avoid waste and flavor is to cut the slices so thin that the hard unclean edge is not apparent, but it is obvious that when the slices have all been cooked impurities that had accumulated on the surface have also been cooked and usually unwittingly eaten, even though unwholesome, indigestible, and if seen as a body extremely repulsive.

The objects of the present invention are; first, to secure absolute cleanliness when delivered ready for cooking; secondly, to save from waste the inner or lean face of the flitch, and preserve to each slice the tender border of lean which belongs to it and which gives taste and character to the entire slice; and thirdly, to improve the flavor and quality of the flesh or lean side of the flitch by curing and packaging the flitch with the flesh or lean side protected by a natural envelop of fat formed by a separated part of the flitch itself.

In the accompanying drawings which illustrate the several steps conveniently followed in preparing a flitch of bacon in accordance with the present invention; Figure 1 illustrates a strip or side of meat, the shape and size of a flitch of bacon commonly exposed for sale in meat stores and groceries. Fig. 2 illustrates the same piece partly prepared in accordance with the present invention. Figs. 3 and 4 illustrate the next two steps in the preparation of the piece of meat for the pickling and smoking processes. Fig. 5 illustrates the preferred form of final package ready for pickling and smoking.

As an illustration of the preferred procedure in carrying the present invention into practice, the strip or side of meat shown in Fig. 1 is severed into two equal parts A and B by a transverse cut, and the rind or skin is cut from one of the pieces as shown in Fig. 2. In this figure the piece A has the flesh or lean side uppermost while the piece B has the fat or skin side uppermost, and the skin C removed from the latter has more or less of the fat adherent thereto, although the cut is made as close to the skin as possible. The pieces having been thus prepared are placed upon each other, as shown in Fig. 3, with the fat side of piece B against the lean side of piece A, and the inner side of the previously removed piece of skin C against the lean side of piece B. The layers of lean are thus located between layers of fat, the soft faces of the fat and inside of the skin making intimate contact with the faces of the lean sides throughout.

Various means may be employed to preserve the relation of the pieces during the pickling, smoking and subsequent handling prior to being sliced and cooked. Conveniently, the pieces may be bound together by light cord or twine which should be applied in separately tied bands G, Fig. 4, whereby in slicing the meat, accidental or unintentional cutting or removal of one band will not loosen or destroy the efficiency of the remaining bands. With the package bound as shown in Fig. 4, the pickling and smoking of the same may be effected in the usual manner, but in order to more effectually protect the meat it is preferably incased in a wrapper of thin fabric such as cheesecloth H, (Fig. 5), the edges of which are stitched down or otherwise secured. The thin fabric in no wise interferes with the pickling and smoking, but serves to protect the meat itself from impurities, thereby preserving the appearance and food value of even the end edges of the slice.

A package prepared as described insures the preservation of the lean in a clean condition, the preservative qualities of the fat are fully utilized, and no hard or inedible faces are formed either as a result of the action of the preservative agents or of subsequent drying.

Having thus described the invention, what I claim as new and desire to secure by Letters-Patent, is:

1. The herein described improvement in packaging and preserving skin covered meat which consists in assembling separate relatively thin layers of meat, one layer with its covering of skin outward and its inner lean side in contact with the outer fat side of the adjacent layer from which the skin has been previously removed, covering the inner lean side of the last mentioned layer with the skin, securing the layers and skin in their relative positions to prevent the entry of impurities between them and subjecting the package to the action of preservative agents.

2. The herein described improvement in packaging and protecting skin covered meat which consists in assembling separate, relatively thin layers of meat with the inner lean side of one layer in contact with the outer fat side of the adjacent layer from which the skin has been previously removed, covering the inner lean side of the last mentioned layer with the skin whereby both faces are skin covered, and securing the layers and skin in their relative positions to prevent the entry of impurities between them.

3. The herein described improvement in packaging and preserving skin covered meat, which consists in assembling separate relatively thin layers of meat, one layer with its covering of skin outward and its inner lean side in contact with the outer fat side of the adjacent layer from which the skin has been previously removed, covering the inner lean side of the last mentioned layer with the skin, enveloping the package with a thin textile fabric, and finally subjecting the package to the action of preservative agents, said envelop operating to prevent impurities in the preservative agents from coming into direct contact with the meat.

LEONARD MOORE.

Witnesses:
PATRICK B. SWEENEY,
JOHN H. UPSHAW.